(12) United States Patent
Lemelson et al.

(10) Patent No.: US 6,898,484 B2
(45) Date of Patent: May 24, 2005

(54) ROBOTIC MANUFACTURING AND ASSEMBLY WITH RELATIVE RADIO POSITIONING USING RADIO BASED LOCATION DETERMINATION

(76) Inventors: Jerome H. Lemelson, deceased, late of Incline Village, NV (US); by Dorothy Lemelson, legal representative, 930 Tahoe Blvd., Incline Village, NV (US) 89451-9436; Robert D. Pedersen, 7808 Gleneagle, Dallas, TX (US) 75248; Tracy D. Blake, 14641 N. 49$^{th}$ Pl., Scottsdale, AZ (US) 85254

( * ) Notice: Subject to any disclaimer, the term of this patent is extended or adjusted under 35 U.S.C. 154(b) by 0 days.

(21) Appl. No.: 10/138,064

(22) Filed: May 1, 2002

(65) Prior Publication Data

US 2003/0208302 A1 Nov. 6, 2003

(51) Int. Cl.$^7$ .............................................. G06F 19/00
(52) U.S. Cl. ....................... 700/245; 700/253; 700/257; 700/262; 700/264; 700/302; 318/568.1; 701/23; 901/1; 901/8
(58) Field of Search ....................... 318/568.1; 700/253, 700/257, 262, 264, 302, 245; 901/1, 8; 701/23

(56) References Cited

U.S. PATENT DOCUMENTS 4,477,754 A    10/1984  Roch et al. ................. 318/568
4,611,292 A    9/1986   Ninomiya et al. .......... 364/559
5,049,796 A    9/1991   Seraji ......................... 318/568

(Continued)

OTHER PUBLICATIONS

Valejo et al., Short–range DGPS for mobile robots with wireless Ethernet links, Jun. 29–Jul. 1, 1998, IEEE, Page(s): 334–339□□.*

Graser Technological Solutions to Autonomous Robot Control, 1998, Internet, pp. 1–8.*

(Continued)

Primary Examiner—Thomas G. Black
Assistant Examiner—McDieunel Marc
(74) Attorney, Agent, or Firm—Edwin A. Suominen; Douglas W. Rudy

(57) ABSTRACT

Global positioning system inputs are used in a manufacturing process where location of a work piece relative to a robotic manipulator is input into a control system. The manipulator is located and tracked by using "GPS" signals, as is an associated work piece. Radio signal based position indicators associated with work pieces transmit work piece location and status. In some embodiments manipulator locations are sensed by position indicators associated with manipulators and signals relating to the position of the manipulators are transmitted to the control system. The control system controls the manipulator and may also control material handling equipment for the transport of work pieces.

29 Claims, 9 Drawing Sheets

U.S. PATENT DOCUMENTS

| | | | |
|---|---|---|---|
| 5,305,427 A | 4/1994 | Nagata | 395/94 |
| 5,404,661 A | 4/1995 | Sahm et al. | 37/348 |
| 5,438,771 A | 8/1995 | Sahm et al. | 37/348 |
| 5,692,412 A | 12/1997 | Rosheim | 74/490.05 |
| 5,694,813 A | 12/1997 | McLaughlan | 74/490.02 |
| 5,811,951 A | 9/1998 | Young | 318/568.2 |
| 5,831,408 A | 11/1998 | Jacobus et al. | 318/568 |
| 5,845,540 A | 12/1998 | Rosheim | 74/490.05 |
| 5,871,248 A | 2/1999 | Okogbaa et al. | 294/86.4 |
| 5,893,296 A | 4/1999 | Rosheim | 74/490.03 |
| 5,946,449 A | 8/1999 | Dickerson et al. | 395/95 |
| 6,032,084 A | 2/2000 | Anderson et al. | 700/241 |
| 6,035,254 A | 3/2000 | Nichols | 701/207 |
| 6,074,164 A | 6/2000 | Spencer et al. | 414/816 |
| 6,105,455 A | 8/2000 | Rosheim | 74/490.06 |

OTHER PUBLICATIONS

Martens et al., A friend for assisting handicapped people, 2001, Internet, pp. 57–65.*

Dixon et al., Mobile robot navigation, 1997, Internet, pp. 1–29.*

Huang et al., Contructino and soccer dynamics analysis for an integrated multi–agent soccer robot system, 2001, Internet, pp. 84–93.*

Ardayfio, David D.; *Fundamentals of Robotics*; Marcel Dekker, Inc., New York (1987).

Rehg, James A.; *Introduction to Robotics in CIM*; Prentice Hall, New Jersey (2000). Not in Possession.

"Analysis of the Displacements of the Pierre–Laporte Suspension Bridge as Measured by Precise GPS Survey," www.scg.ulaval.ca/gps–rs/en/Abstract/ResRSLL498.htm, Jan. 2001.

Shaw, Michael; Sandhoo, Kanwaljit and Turner, David; "Modernization of the Global Positioning System," www.gpsworld.com/1000/1000shaw.html; Jan. 2001.

"How GPS Works;" www.tfhrc.gov/pubrds/fall95/p95a5.htm; Jan. 2001.

Dana, Peter H.; "Global Positioning System Overview;" www.colorado.Edu/geography/gcraft/notes/gps/gps.html; Jan. 2001.

"The GPS System;" www.wapnt.com/html/system.html; Jan. 2001.

* cited by examiner

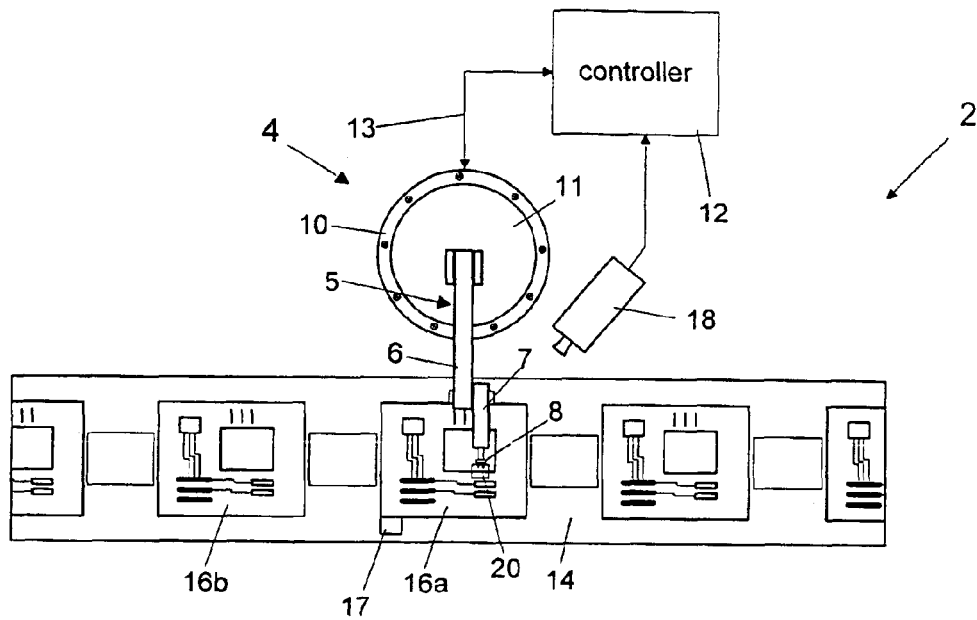
Fig. 1A (EXISTING ART)
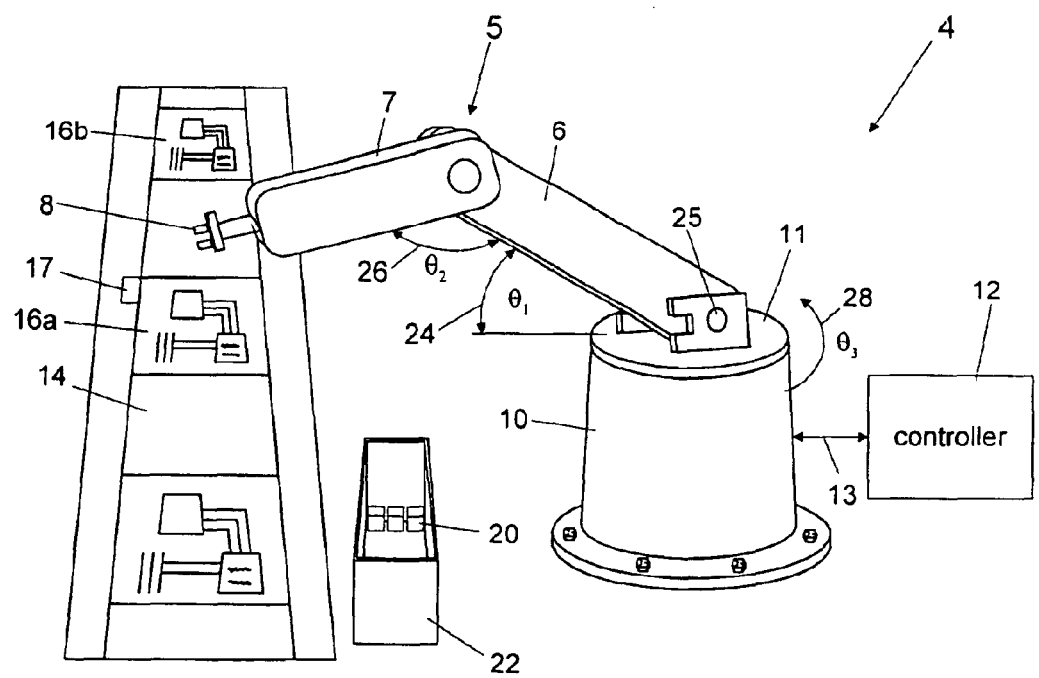
Fig. 1B (EXISTING ART)

Fig. 3 (EXISTING ART)

ROBOTIC MANUFACTURING AND ASSEMBLY WITH RELATIVE RADIO POSITIONING USING RADIO BASED LOCATION DETERMINATION

BACKGROUND OF THE INVENTION

This invention relates to a robotic manipulator system that obtains position information of a work component and/or a controllable tool using radio positioning technology to assist in automatic manufacturing processes. Robotic manipulators have been used in automatic manufacturing environments for many years, and their use is growing at a rapid pace. Robotic manipulators can, in many instances, out perform human labor performing similar operations. Radio positioning techniques are also known and are used extensively in the navigation of airplanes, marine vessels, automobiles, construction equipment, and other applications. The most popular form of existing radio navigation is the well-established NAVSTAR Global Positioning System (GPS).

Robotic manipulators serve many different manufacturing functions but are different than single purpose machines performing what is known as "hard automation." Hard automation machines are designed and configured to repetitively perform a single tasks, and normally perform that task with great efficiency and speed. The primary distinction between robotic manipulator systems and hard automation machines is the programmable flexibility of the robots. The International Standards Organization (ISO) defines industrial robots in standard ISO/TR/8373-2.3:

A robot is an automatically controlled, reprogrammable, multipurpose, manipulative machine with several reprogrammable axes, which may be either fixed in place or mobile for use in industrial automation applications.

Most single purpose hard automation machines do not meet the requirements of reprogrammable or multipurpose. Although multipurpose robotic manipulators typically have a higher initial cost and slower speeds than hard automation devices they replace, they usually reduce overall manufacturing costs by reducing the total number of machines required to handle all of the processes involved in a single manufacturing environment.

Initially robotic manipulators were replacements for humans in the manufacturing process. As the role of robotic manipulators increased to broader areas of manufacturing, the need for a more structured approach to their functioning became apparent. Robotics is combined with modem computer technology as part of Computer Integrated Manufacturing (CIM) systems. CIM concepts guide manufacturers through the process of planning and identifying automation hardware and software requirements for a particular product. Additional background material on robotics fundamentals can be found in the following publications, each of which is incorporated herein by reference: Rehg, James A., *Introduction to Robotics in CIM*, Prentice Hall, New Jersey (2000), ISBN 0139012087; Ardayfio, David D., *Fundamentals of Robotics*, Marcel Dekker, Inc., New York (1987), ISBN 082477440X.

Typical robotic systems have a mechanical arm attached to a fixed base or attached to a railing or overhead gantry system providing a horizontal and/or vertical axis of movement. The robotic arm provides the motion required to attain proper positioning of an end effector so the robotic system can perform the desired task on a work piece. The end effector is the part of the mechanical arm that holds a tool, performing such tasks as cutting, welding, fastening, tapping, drilling, etc. or grasps a part to be placed or removed on an assembly. There are many types of end effectors that can be attached to the end of any given robotic arm to provide flexibility in performing multiple manufacturing tasks.

Robotic arms can be categorized into four basic geometries: Cartesian, cylindrical, spherical, and articulated. The different geometries have advantages and disadvantages that must be considered when specifying a robotic manipulator system for a particular manufacturing environment. Each of the four geometries has a range of useful arm movements that creates what is referred to as the "work envelope." Articulated robots, also known as anthropomorphic robots, allow the most complex type of movements but has the tradeoff of requiring the most sophisticated controlling hardware and software.

Another factor determining the flexibility of a robotic system is the number of axes, or degrees of freedom (DOF), that the robotic system exhibits. Each driven link in a robotic arm provides for one degree of freedom. Most robotic arms have at least three degrees of freedom, and having six or seven is not uncommon. Having a robotic system with more degrees of freedom allows for more complex manufacturing tasks to be undertaken. Many robotics systems have been devised or existing systems improved upon as seen in U.S. Pat. Nos. 6,105,455; 6,074,164; 5,893,296; 5,871,248; 5,845,540; 5,811,951; 5,694,813; 5,692,412, each of which is incorporated herein by reference.

GPS is a well-established radio navigation technique based on the use of a constellation of twenty-four satellites in carefully placed geo-synchronous orbits. Ground control stations monitor and correct the performance of the satellite broadcasts to maintain a high level of accuracy. Receivers on the earth lock onto ranging signals from multiple satellites and calculate receiver position (latitude, longitude, and elevation) using a mathematical technique known as trilateration or resection. Initially the GPS system provided two modes of operation, the standard positioning system (SPS) signal and the precise positioning system (PPS) signal used by the military. The SPS is lower precision version of the PPS meant for use by the general public, while the improved PPS was restricted for use by the military. Selective Availability (SA) was employed to additionally reduce the precision of the SPS. As engineering accomplishments reduced the error due to SA, it became obsolete and was removed from operation. All sectors of GPS users now have access to the more accurate SPS.

Even with the more accurate SPS, position errors are inherent in the positioning determining process due to atmospheric distortion, multi-path, and other factors. The GPS satellites are in orbits of about 11,000 miles, degrading the positioning signal as it passes through the ionosphere and troposphere. The positioning signal can also bounce off mountains, buildings, or other interfering objects creating one or more delayed signals giving rise to a condition known as "multi-path." Other positioning errors are experienced by GPS receivers due to clock and ephemeris (orbit) error. Errors also arise due to receiver "noise" in the electrical/electronic context. The following table is a summary of GPS error sources ["Trimble—How GPS Works," available on the Trimble Co. internet website as of Jul. 2, 2001]:

| Error Source | Typical Error in Meters (per satellite) |
| --- | --- |
| Satellite Clocks | 1.5 |
| Orbit Errors | 2.5 |
| Ionosphere | 5.0 |
| Troposphere | 0.5 |
| Receiver Noise | 0.3 |
| Multipath | 0.6 |

The need to minimize the effects of the GPS positioning errors led to the development of the Differential Global Positioning System (DGPS). If a position on earth is known very precisely, the position error for that position, for any given time of day, can be determined. DGPS ground stations with precise known positions broadcast error information for a particular geographic region. DGPS adds to system cost and is not always necessary, but it is usually found in high population areas. Many concepts and systems for control of vehicles or other processes using GPS and DGPS positioning exist. For instance, see U.S. Pat. Nos. 6,161,072; 6,052,647; 6,035,254; 6,032,084; 6,024,655; 5,995,882; 5,983,161; and 5,438,771, each of which is incorporated herein by reference.

Locational reference systems are important to radio positioning as they define an area in which the positioning effort is to be performed. Earth-based locational reference systems are used to define the irregularities of the earth for more precise positioning. There are many different types of earth-based locational reference systems, the simplest of which is a sphere. More complex reference systems are based on an ellipsoidal earth and complex gravity models. Reference ellipsoidal models enhance distance and direction measurements over long distances. Reference ellipsoids are based upon the earths' irregular shape due to a slight flattening at the earth's poles.

More precise positioning requires more details about the irregularities of the earths' surface. The science of geodesy involves modeling of the earth using more complex techniques such as gravity models and geoids. Geodetic datum reference systems use these techniques to create more accurate models of the earth's surface. There are many different datums available with varying accuracy. The World Geodetic System 1984 (WGS 84) geodetic datum is globally accepted as the most accurate. GPS receivers typically have multiple geodetic datums on board for use in varied applications.

Another highly accurate implementation of radio positioning is relative GPS. Relative GPS is similar to DGPS in that it is assumed that two receivers in close proximity exhibit the same inaccuracies due to the signal path and processing performance limitations. The relative positions between two closely placed receivers can then be determined very accurately. The main difference between DGPS and relative GPS is the mobility of relative GPS. DGPS stations are at fixed locations. Relative GPS systems can be taken to work sites anywhere in the world and even used in applications where both GPS receivers are in motion. Systems are available that implement this concept of relative GPS. They are primarily used in surveying.

GPS receivers typically perform the calculations necessary to resolve their immediate position using raw position information from multiple satellites in line-of-sight locations. This implies having the necessary processing hardware and memory for storing datum and other information. Translated GPS is a concept where raw position signals from the receiver are translated to a different frequency and transmitted to a host site that performs the necessary calculations to determine the current position. This considerably reduces the hardware complexity and size of the receiver. Translated GPS is very useful in an environment where many small and inexpensive receivers are required.

Computer vision is used extensively in automatic manufacturing for object inspection, location determination, dimensional measurements and control of robotic manipulators. Computer vision systems used to determine object location typically employ pattern recognition. Such systems convert image signals generated using some form of imaging device to digital signals that can be processed with a computer. The location of a particular pattern is sought and when a "match" is found a programmed response can be implemented by the vision system. The controller for the particular manufacturing operation takes the appropriate action based on the response from the vision system. Representative art involving computer vision techniques include, but are not limited to, the following: U.S. Pat. Nos. 6,175,652; 6,173,070; 6,115,480; 5,949,901; 3,081,379; 3,854,889; 4,338,626; 4,118,730; 4,979,029; 5,119,190; 4,984,073; 5,067,012; 4,511,918; and 5,023,714. Additional background information can be found in: Aleksander, I., *Artificial Vision for Robots*, Chapman and Hall, New York (1983), ISBN 412004518. Each of the above patents and publications is incorporated herein by reference.

SUMMARY OF THE INVENTION

This invention relates to a method and apparatus for positioning control of a robotic manipulator and/or work pieces used in automated manufacturing environments. The invention uses GPS, or other radio positioning technique, for position information to be used by the robotic system controller in calculating relative positions between position indicators on work pieces and position indicators on robotic manipulators. Position indicators incorporate radio positioning receivers and any other functions required to implement robotic manipulator control in an automated manufacturing system.

In typical manufacturing environments, robotic manipulator components (end effectors, work pieces, and parts) are positioned such that the relative positions between them are precisely defined allowing for preprogrammed repetitive processes to be implemented. The robot itself typically works from a fixed base. Work pieces are moved into place with programmed motions. Proper operation typically requires an exact knowledge of the position of the work piece relative to the robot so that preprogrammed operations can be carried out.

In a broader sense this invention discloses, not only apparatus and a system for use in a manufacturing environment, but the invention also encompasses a method of interfacing an object, such as, but not limited to, a work piece, with a transitionable element (meaning an element that is capable of being transitioned or moved by any means, to a location not currently located by the element), such as, but not limited to a propelled tool. The contemplated method includes the acts of associating, usually by attaching, a marker, for instance, a transmitter, transponder or transceiver, with the object, determining the location of the object and storing, in a controller or processor, the location of the object. In this situation there may be a marker associated with (in one embodiment "associated with" would mean "attached to") the transitionable element. The next act in this broad method is determining the location of the transitionable element and storing the location of the transitional element in the controller or processor. With these acts accomplished the system can, through processing techniques performed by a properly programmed controller or processor, determine the location of the object relative to the transitionable element, and thereafter, finally affect the location of the transitionable element relative to the object by, for instance, moving the transitionable element toward or away from the object.

In the applicants' invention a particular embodiment may include resection, triangulation, or any other radio signal positioning technique, to determine relative position information between robotic manipulators and work pieces or parts. The invention is effective with fixed based robots, robots on fixed rails or overhead gantries, and robots free to move about in the manufacturing environment. The robots, work pieces and parts do not have to be at exact known locations. Rather, radio-positioning techniques produce position coordinates in a common global reference frame to define their relative positions. A preferred method of relative positioning uses the existing NAVSTAR Global Positioning System (GPS) for attaining position information. The GPS or other radio positioning system indicators provide relative positioning information to the robotic motion controllers that are used to assist in locating the manipulator, work pieces, and parts.

Currently centimeter accuracy is available in GPS systems employing sophisticated techniques such as differential carrier phase analysis. Research into improving GPS positioning techniques will allow for sub centimeter accuracy in the near future.

Radio positioning techniques, such as GPS, rely on a receiver being able to determine its distance from transmitters at known locations (satellites in the case of GPS). Using code division multiple access (CDMA) spread spectrum communication techniques, encoded timing information can be uniquely discerned from individual satellites. A communication technique like CDMA allows multiple transmitters to broadcast information on a single carrier frequency.

The current invention, like GPS, uses CDMA or some other similar communication technique to handle communication between multiple positioning indicators. The invention employs position indicators located on robotic manipulators, work pieces, parts, and other features in a manufacturing environment. These position indicators send position information about the manipulators, work pieces, parts, etc., to a controller governing a manufacturing process.

The relative positions between the position indicators are determined to a high degree of accuracy because all position indicators experience the same or nearly the same absolute positioning errors arising from propagation anomalies, clock inaccuracies, and other system inaccuracies. Such absolute errors are removed in the subtraction operations used to determine relative locations.

In currently used robotic systems detailed orientation of the individual links in the manipulator must be known all times for proper operation of the robotic system. Currently used sensor techniques are very effective in determining the orientation of each axis of a link relative to its point of rotation or other type of motion. As an alternative to currently available position sensors, GPS, or other radio positioning technique, position indicators are placed on each axis of a manipulator to provide position information about the individual links to the controller. One advantage of using radio positioning for link position information is the reduction of calibration efforts required at startup. Some conventional sensor types require that the robotic manipulator be driven to a known position to initialize the sensor output. Radio positioning indicators will always know their exact location as soon as the positioning system is powered up.

Once the orientation of the manipulator links, using conventional or radio positioning techniques, is known the position of the work pieces and parts must also be determined. The current invention places GPS based position indicators at a sufficient number of locations (on the manipulator, work piece, and parts/parts bins) to provide the controller with the position of the work pieces and parts relative to the manipulator. If some information is guaranteed about the location or orientation, a reduced number of GPS position indicators are required. For example, if a work piece is moving down a conveyor, its edges may be kept parallel and a constant elevation maintained by the conveyor. Under these conditions, determining the relative position of the manipulator and work piece is a one-dimensional problem and only one GPS position indicator is required on the work piece to provide this information. With less information known about the position and orientation, additional position indicators are required. A maximum of three position indicators are required to locate a plane in three-dimensional space. With the current state of the art in integrated circuit manufacturing, GPS receivers and radio transmitters can be produced in very small packages minimizing their obtrusiveness in the manufacturing process.

The current invention incorporates relative GPS, or other radio positioning techniques, for placement of a work piece. A technician, conveyor, or other conveyance apparatus in the manufacturing facility places a work piece within a specified position tolerance for the desired operation to take place. At this point the position of the work piece relative to a GPS position indicator on the base, or any fixed location, of the manipulator can be determined. The relative position is calculated by subtracting the coordinates of the position indicator from the coordinates of the position indicator fixed on the robotic manipulator. The coordinates are transmitted from the position indicators to the controller where the calculations are performed. The manipulator is programmed using one of the many techniques available, such as lead-through programming. After the initial programming, subsequent work pieces are moved into place using relative radio positioning. For example, as a work piece moves down a conveyor the GPS position indicator transmits its current position, which is then subtracted from the coordinates of the manipulator's position indicator. When the relative position between the two position indicators is equal to the value established during setup of the process, the conveyor is stopped and the manipulator performs the desired function on the piece.

More sophisticated control can be implemented to enhance performance of relative radio positioning based manufacturing processes. For instance, the controller may allow faster movement of the work piece when the relative position is above a certain value. When the relative position starts to get close to the desired value the controller instructs the motion system to slow down. This process may be repeated several times until the work piece is slowed to a point that accurate positioning can be easily accomplished.

Robotic manipulators are typically confined to a limited area and range of motion (work envelope) due to having a fixed base or movement capability on fixed rails or overhead gantries. Constraining the allowed travel of the robotic manipulator within a particular manufacturing environment restricts overall flexibility and may require more robotic manipulators than necessary. The current invention includes the placement of GPS position indicators on a mobile robotic manipulator base, allowing the robotic manipulator to be positioned anywhere in the manufacturing facility. A mobile robotic system with mounted GPS position indicators has the ability to perform many functions by simply moving to a new assembly line or other function required by a manufacturing process.

Aircraft manufacturing is an example of a labor-intensive process that would benefit from use of mobile robotic system in assembly. GPS position indicators are placed at locations on any piece of the aircraft providing the controller with exact information about where a particular process will take place. The process, already programmed in the controller, instructs one or more mobile robotic systems to move to the desired location and perform the assembly task. For example, position indicators are placed on the frame of an aircraft at a location signifying the position for a row of rivets to be installed. A mobile robot is instructed to move to a relative floor location compatible with the operation of placing the rivets. The controller has preprogrammed information about where each rivet in the row must be placed once the mobile robot, also known as mobile manipulator, is in the proper position. After performing the task of placing rivets, the mobile robot may then be instructed to drill holes for engine placement, or whatever task is assigned to carry on the assembly process.

Typical manufacturing environments have parts and tools delivered to a robotic manipulator system fixed in a given location. This invention may use relative radio positioning to define locations for parts and tools. With relative GPS, or another relative positioning system, coordinates of the exact location of parts and tools in a storage area are determined. Radio positioning indicators are placed on the storage units and the robotic manipulator is programmed with relative locations of particular parts and tools. This process is accomplished similar to work piece positioning, except that the manipulator itself is moved into the relative position. Another use for this concept is in manufacturing environments where existing fixed robotic manipulators are supplied parts and/or tools by special manipulators programmed specifically for the function of delivering the needed parts/tools.

With a mobile robotic manipulator and storage area based on relative GPS, certain types of manufacturing can become almost completely autonomous. Using the aircraft assembly example, if a group of mobile robotic manipulators have access to all the necessary parts and tools in a storage area, they can perform most of the assembly tasks. The controller instructs a particular robot to acquire a certain tool and related parts and then perform tasks requiring that type of tool. The controller then instructs that robot to get another tool and related parts to perform the next task in the assembly of the aircraft. Each process to be performed is preprogrammed by a technician using relative type position measurements, with a GPS position indicator at each location for accomplishing the relative positioning of the robotic manipulator.

It is therefore an object of this invention to provide a robotic system that uses a relative radio positioning system to identify the locations of various robotic manufacturing components.

It is another object of this invention to use radio positioning position indicators fixed on a robotic manipulator and work piece in a relative positioning scheme.

It is another object of this invention to replace conventional work piece and parts bin positioning sensors with radio positioning position indicators to identify their locations relative to the robotic manipulator.

It is another object of this invention to perform automatic manufacturing tasks where work pieces, end effector, and parts are not at predefined locations but have been programmed with relative positioning.

It is another object of this invention to use relative radio positioning techniques on mobile robotic manipulators to perform multiple functions on fixed work piece operations, such as airplane assembly.

It is another object of this invention to have a mobile robotic manipulator be able to acquire new parts and tools from a storage area using some form of relative radio positioning.

It is another object of this invention to provide for robotic manipulators that can be instructed to perform tooling changes without human intervention.

It is another object of this invention to transmit raw position information from the radio positioning position indicators to a host computer for processing.

It is another object of this invention to use computer vision to enhance relative radio positioning techniques.

The preferred embodiment of the invention is described in the following Detailed Description of the Invention and attached Figures. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means or step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

For example, the disclosed system describes using the NAVSTAR global positioning system for position information in a robotic manipulator system. The system could also be implemented using the GLONASS system or a combination of GPS and the GLONASS system, or other radio position techniques.

Likewise, there is a disclosed controller with some form of intelligence, such as a microprocessor, to perform calculations associated with the robotic manipulator system. The specific form of this intelligence determined by the situation and environment wherein the controller functions.

BRIEF DESCRIPTION OF THE DRAWINGS

The invention will be readily understood through a careful reading of the specification in cooperation with a perusal of the attached drawings wherein:

FIG. 1A is a plan view example of an assembly type robotic manipulator system using conventional positioning techniques.

FIG. 1B is a pictorial representation of an isometric view of an assembly type robotic manipulator system using conventional positioning techniques.

DETAILED DESCRIPTION OF THE DRAWINGS

Figure 2:
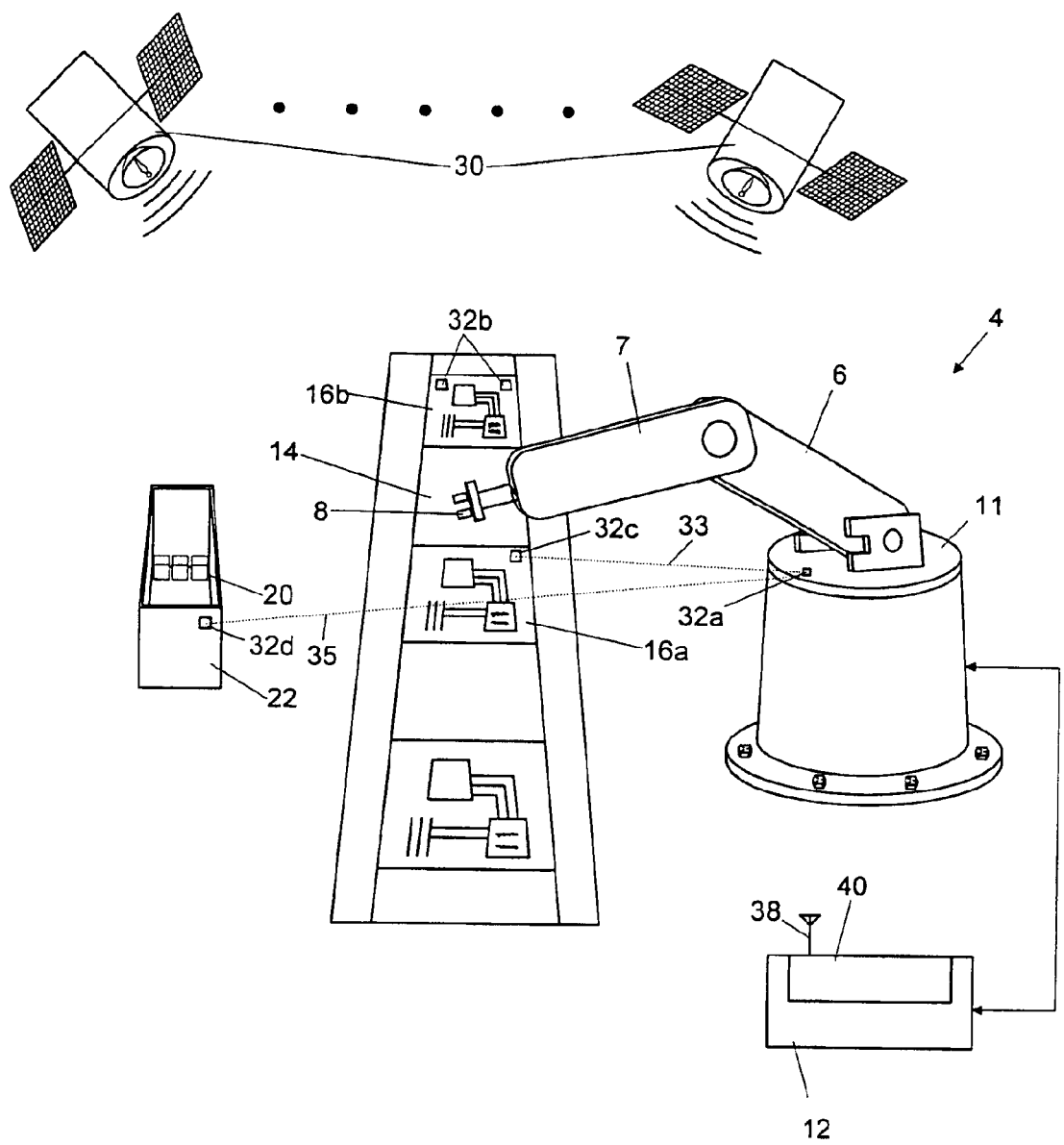
FIG. 2 is a pictorial representation of an assembly type robotic manipulator using relative GPS for positioning.

Typical manufacturing processes involving robotic manipulators require that the trajectory followed by an end effector of the manipulator relative to the work piece be fixed and exactly repeated numerous times. This requires a detailed knowledge of where the end effector, work pieces, and parts are at any given time, more specifically, at predefined positions determined before manufacturing begins to be optimal for the given process. The work piece is moved along a conveyor, or other types of transport hardware, on a prescribed route until the work piece reaches a desired location and signals a controller that the work piece is in place and that the process can begin. The controller then sends the drive signals to move the robotic manipulator in a preprogrammed sequence of operations. At the conclusion of the sequence of operations the controller instructs the manipulator to return to the manipulators initial/home position to repeat the sequence of operations on a new work piece or go to a new position to perform a different task, such as involved with the process of placing multiple parts onto a single work piece. The work piece is subsequently moved to a next step in the manufacturing process, for example, packaging of the completed product.

FIGS. 1A and 1B demonstrate a plan view and side perspective view of a typical existing robotic manipulator configuration used in a line-type manufacturing system. Other types of manufacturing systems include project, job shop, repetitive, and continuous type systems, which have their own typical configurations. The robotic manipulator system shown in FIGS. 1A and 1B is depicted performing a repetitive process on a work piece, such as placing parts, as the work piece moves down a conveyor, or through another material handling system.

The manipulator, generally 4, shown in FIGS. 1A and 1B, is comprised of a two link mechanical robotic arm generally 5 having a first link 6 and a second link 7 with an end effector 8. The arm is supported on a fixed base 10 that may also be attached to a moveable platform on rails or overhead gantry (neither embodiment shown), representing one or more linear axes of motion. The arm 5 is attached to an input power source (not shown) capable of driving the arm 5 through desired motions. Possible power sources include, but are not limited to, electrical, hydraulic, pneumatic, or a combination of more than one type of power source. A controller 12 provides intelligence for determining what motions the robotic arm should undertake and processes input (position, speed, and acceleration sensors) and generates output drive signals associated with the robotic arm. The functions associated with the controller may be distributed and not necessarily contained in one unit, as seen in some forms of networked computer integrated manufacturing (CIM) systems. Signal transmission media types interfacing 13 to the controller 12 include, but are not limited to, wire, fiber optic, and radio transmission.

In addition to the robotic system, the line-type manufacturing process demonstrated in FIGS. 1A and 1B uses a conveyor system 14 moving work pieces 16a and 16b to the desired location for the robotic manipulator to perform the prescribed task. Work pieces 16a and 16b are positioned on the conveyor and their progress down the conveyor is monitored closely. Position sensor 17 on the conveyor 14 provide the controller information about when a work piece is in the correct position. An alternative approach to position sensors, such as 17, is computer vision. A camera 18, as demonstrated in FIG. 1A, digitizes the image of the work piece and can determine, through software processing of the image, if the work piece is in the desired location. The computer vision system may be a video scanner, a camera, a laser scanner or an array of photosensitive elements, or the like as is appropriate to provide position and/or alignment information to the system.

A typical robotic process in a line-type manufacturing system starts with end effector 8 acquiring a part 20 from a storage bin 22 holding it while the mechanical arm 5 is driven to the position required by the particular operation. The parts 20 (see FIG. 1B) and storage bin 22 must also be in a predefined location for the controller to accurately guide the manipulator to acquire the part 20. The controller 12 then drives the mechanical arm 5 to move the end effector 8 to the location where it will interact with the work piece. For example, in a manufacturing assembly operation as shown in FIG. 1A, the end effector 8 acquires and holds the part 20, to be placed on the work piece 16a. When the assembly is positioned correctly proximate the work piece 16a, the robotic arm 5 is driven by the controller and inserts the parts into the proper location on work piece 16a. The robotic arm then moves to a position clear of the work piece, possibly back to its original position at the start of the task, and the conveyor 14 moves the next work piece 16b into place and the robotic manipulator performs the same actions as previously outlined.

Controller programming moves the manipulator based upon an a priori knowledge of predefined positions of the work piece, such as 16a and end effector 8. FIG. 1B shows three link angles that the controller monitors by receiving information from the position sensors. The angle $\theta_1$ 24 is the angle of the first link 6 pivoting at a pivot point 25 attached to the rotating plate 11 portion of the base 10. The angle $\theta_2$ 26 is the angle of the second link 7 relative to the first link 6. The angle $\theta_3$ 28 is the angle of the rotating plate 11 attached to the first and second links, 6 and 7, relative to the fixed base 10. There are also sensors (not shown) associated with the position of the end effector 8 that differ with the particular configuration of the robotic manipulator. One possible nomenclature scheme defines movements using terminology used in aviation where orientation of the end effector, like an aircraft, is defined in terms of roll, pitch, and yaw.

Sensor outputs for speed and acceleration (not shown) of the mechanical arm 5 are also required for use in dynamical calculations providing optimal motion of the arm 5. Position, speed and acceleration can also be determined from a single position sensor (per axis) as speed and acceleration are merely the first and second time derivatives of position. Computer processing permits performing these calculations very quickly, but it must be remembered that velocity and acceleration are vector quantities and not scalars due to three-dimensional motion of the arm.

The present invention does not require that the material handling system, such as the conveyor, have sensors to determine if the work piece 16a is in position. Positioning of the work piece 16a is accomplished through calculation of its position relative to a GPS position indicator fixed on the robotic manipulator 4. The position coordinates from the GPS position indicators attached to the manipulator arm 5 and work piece 16a are transmitted to the controller 12 for determination of conformance within the desired relative locations.

FIG. 2 demonstrates how GPS satellites in conjunction with position indicators on the robotic manipulator, work piece, and parts bin provide required relative position information to the robotic manipulator's controller. The infrastructure of the GPS system includes a constellation of twenty-four satellites that broadcast information unique to each of the satellites and is used by position indicators in determining an accurate position of the position indicator in a global frame of reference.

In FIG. 2, two of the satellites 30 are shown transmitting position information to a position indicator 32a located on the manipulator base rotating plate 11, position indicators 32b and 32c located on work pieces 16a and 16b respectively, and a position indicator 32d located on a parts storage bin 22 holding the parts 20 to be assembled to the work pieces, such as 16a and 16b. Multiple position indicators for each unknown dimension (x, y, or z) may be required on the work pieces or parts bin. The position indicators lock onto the timing signals from a sufficient number of satellites to calculate a three-dimensional position that is broadcast to the controller 12 using onboard transmitters. Typically four satellites will give close to the maximum accuracy attributable to a given GPS receiver design. Most receiver designs have a minimum of 12 channels, allowing simultaneous communications with up to 12 satellites.

After receiving encoded timing signals from the GPS satellites, the position indicators 32a–d calculate their positions. This information is then broadcast using onboard transmitters. The broadcast information is picked up by controller antenna 38 and processed by the radio communications section 40 of the controller. The radio communications section performs standard types of analog or digital signal processing used in communication circuitry or may simply demodulate the signal that is then digitized and processed digitally by the controller. Since many position indicators are required if the process is to be repeated many times (many work pieces and parts) more sophisticated digital communication techniques become very useful to uniquely identify each of the position indicators. Code division multiple access (CDMA) spread spectrum communication technology, such as used in current cellular telephones, is contemplated as being used and would be very effective in this type of system with multiple transmitters. Other types of spread spectrum techniques could also be used in a local radio positioning system. Other possibilities include well known frequency division multiplexing (FDM) or time division multiplexing (TDM).

Once the controller has determined the absolute global position of each position indicator, relative positions are calculated. This is a simple subtraction of coordinates to give the offsets (latitude, longitude, altitude) from one of the position indicators. FIG. 2 shows a construction line 33 for the position of a position indicator 32a on the rotating plate 11 relative to the position indicator 32c on a work piece. Likewise, another construction line 35 demonstrates the position of a position indicator 32a located on the rotating plate 11 relative to the position indicator 32d on the parts bin 22. Knowing these relative positions the controller 12 can calculate the necessary movement required to position the end effector 8 to perform a required task. A position indicator does not have to be located on the end effector 8 as the end effectors position can be determined by knowing the position of the links and rotating plate of the manipulator generally 4. With information about the position of the rotating plate 11, the links 6 and 7, the angles between the links and the links and the base angles, and the end effector 8 orientation, the controller can determine the exact location of the end effector 8 using geometric relationships.

The number of GPS position indicators required on each work piece and parts bin is determined by the geometry of the particular process, more specifically the orientation of the work pieces to the robotic end effector. If, for example, a conveyor system can maintain edges of the work piece parallel to the conveyor and the height of the conveyor is constant, only one position indicator would be required to calculate the one-dimensional relative positioning information required to locate the piece. If the conveyor system can only maintain the work piece flat (lying in one plane) on the conveyor, the positioning system must solve a two-dimensional relative position problem requiring two position indicators to be located on the work piece. Two points in a known plane allows determination of a line in that plane that in turn allows calculation of the position of a flat object in that plane. If a work piece in a particular process has no known orientation to the manipulator (random location), determination of an exact position of the object becomes a three-dimensional relative positioning problem and three GPS position indicators on a work piece would be required to calculate the necessary relative positions.

Figure 3:
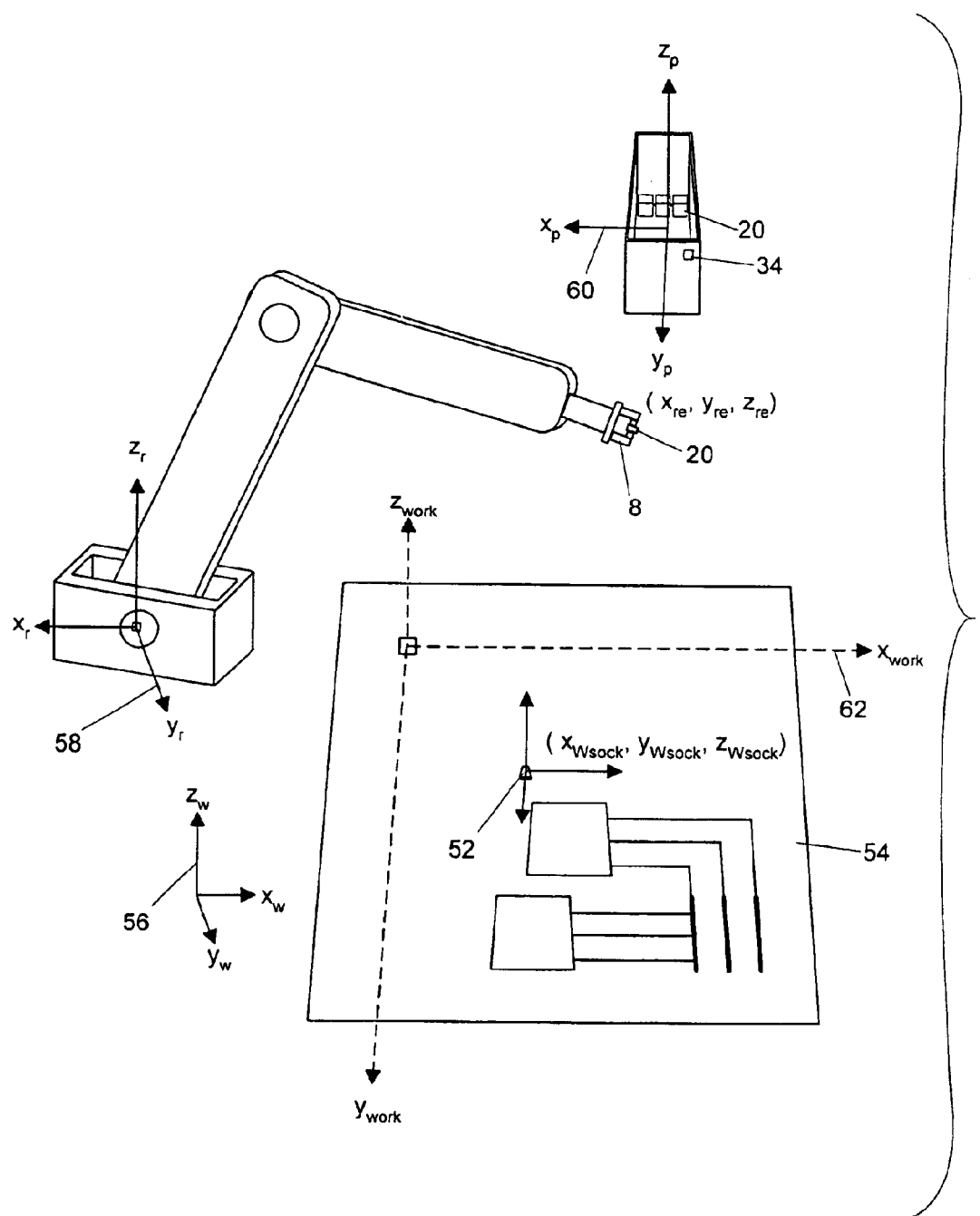
FIG. 3 shows reference frame definitions associated with environment and hardware elements for use in a robotic system.

FIG. 3 demonstrates the basic solution of how a robotic manipulator system identifies relationships between the end effector, parts bin, and work piece to perform an assembly task. In this example a robotic manipulator end effector 8 is going to place a part 20 into a socket 52 on the work piece 54. Knowledge of the position and orientation of the components of the process (robotic manipulator axes, end effector 8, part 20, and work piece 54) relative to each other requires the use of reference frames to reduce computational complexity in the controller. Reference frames can be arbitrarily assigned, but careful placement makes some reference frames very useful to robotic manipulator systems. A world reference frame 56, shown in FIG. 3 is defined ($x_w$, $y_w$, $z_w$) 56 to provide a common coordinate system to relate all other reference frames. For example, if the socket 52 is at coordinates ($x_{Wsock}$, $y_{Wsock}$, $z_{Wsock}$) in the world reference frame 56 and the end effector 8 is moved to a location ($x_{Wsock}$, $y_{Wsock}$, $z_{Wsock}$) by translation from the robot reference frame 58 then they are at the same location. If the robot has a fixed based, it can be made the world reference frame simplifying calculations.

The robot reference frame ($x_r$, $y_r$, $z_r$) 58, of FIG. 3, provides for minimal computational complexity associated with the calculation of the drive signals for each axis of the robotic arm. Other reference frames that may be defined for modeling of the manipulator system are the parts bin reference frame ($x_p$, $y_p$, $z_p$) 60 and the work piece reference frame ($x_{work}$, $y_{work}$, $z_{work}$) 62. Depending upon the geometry of the particular manufacturing environment different numbers of reference frames will be required. Translation of coordinates between reference frames is required when making calculations for determining what motions the robot will accomplish. For example, kinematic and dynamic expressions are developed in the robot reference frame, but if the position of the final location for the part is defined in the world reference frame ($x_w$, $y_w$, $z_w$), it must be translated to the robot reference frame before the controller performs the necessary kinematic and dynamic calculations for the next movement of the manipulator.

With placement of the GPS position indicators on the work piece as demonstrated in FIG. 2, the controller can be programmed to move the end effector 8 (or tool) in the desired path to accomplish the necessary manufacturing task. In many cases the arm is programmed to move through intermediate steps called "way points." A mathematical model for the controller is useful in system design. Inverse kinematic and dynamic equations for the particular geometry of any given manipulator may be used to model arm movements. Inverse kinematics of the manipulator determine the orientation for each axis in the manipulator so that the end effector can achieve its desired position and perform the desired manufacturing task. With the inverse kinematic equations and knowledge of the extreme points of motion allowed by the links in the arm, the work envelope of the manipulator can also be determined.

Figure 6:
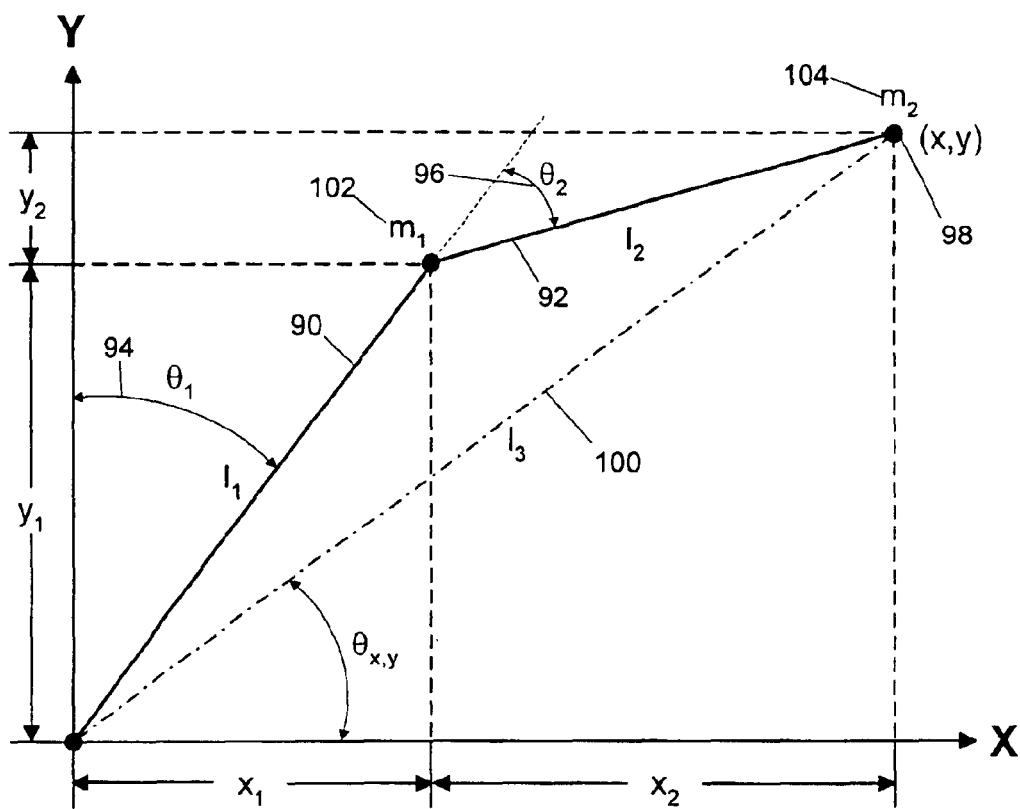
FIG. 6 defines geometry of a two revolute link manipulator for kinematic and dynamic system calculations.

FIG. 6 is an example geometry of a revolute jointed robotic arm with two links used for determining inverse kinematic and dynamic expressions as developed in David D. Ardayfio, "Fundamentals of Robotics," Marcel Dekker, 1987. The X and Y coordinates in this example are comparable to $x_r$ and $y_r$ of the robot reference frame 58 defined in FIG. 3. In the present invention, X and Y are corrected by $\Delta x$ and $\Delta y$ to account for offset errors in relative positioning of the manipulator and the work piece. With these corrections, kinematic equations as described below may be used to assist in proper robot positioning. Corrections for more degrees of freedom in relative positioning errors can be made in a similar manner.

Figure 5:
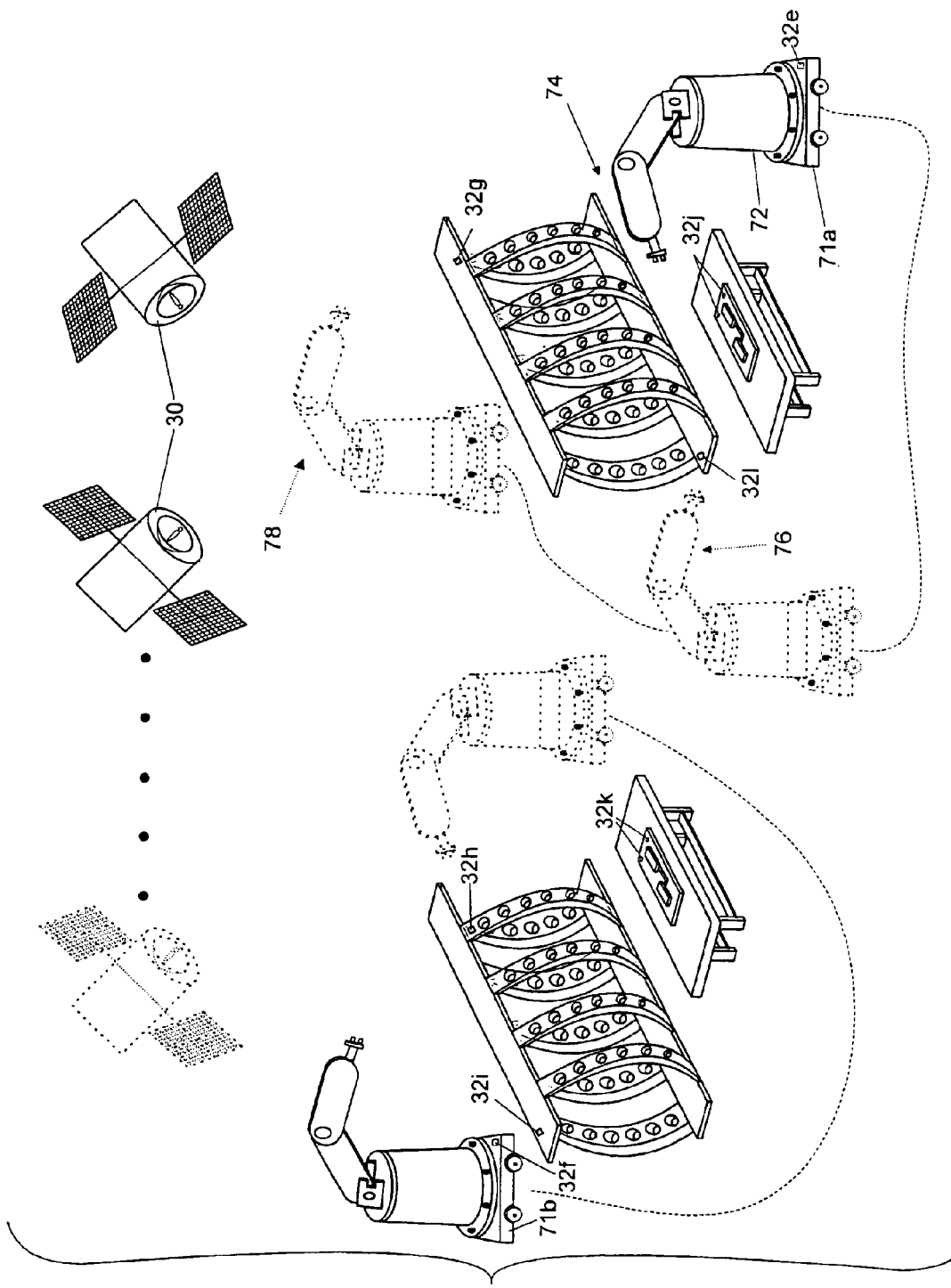
FIG. 5 shows a manufacturing environment with fixed work pieces and mobile robotic manipulators.

In FIG. 6, derived from, and set forth in, the Ardayfio publication mentioned above, the centerlines of the first and second links, 90 and 92 respectively, are used to ease the determination of the kinematic equations governing the motion of the arm. In this example the revolute links are restricted to motion in two dimensions. The first link 90 is identified by length $l_1$ and angle $\theta_1$ 94 that is defined to be with respect to the Y-axis. The second link 92 is identified by length $l_2$ an angle $\theta_2$ 96 that is defined to be with respect to the orientation of the first link 90. The lengths $l_1$ and $l_2$ are defined to be the distance between the center points of the joints for each link. The coordinates of the end effector based upon the angles $\theta_1$ and $\theta_2$ is defined to be at point (x, y) 98. The components of each link in the X direction are defined to be $x_1$ and $x_2$ respectively. The components of each link in the Y direction are defined to be $y_1$ and $y_2$ respectively. With this information, kinematics of this system can now be determined based on the analysis set forth in Ardayfio. From FIG. 6 we see that, $$x_2 = x - x_1 \tag{1}$$

$$y_2 = y - y_1 \tag{2}$$

from FIG. 5 we see that, $$x_1 = l_1 \sin \theta_1 \tag{3}$$

$$y_1 l_1 \cos \theta_1 \tag{4}$$

$$l_2^2 = x_2^2 + y_2^2 \tag{5}$$

substituting (3) and (4) into (1) and (2) we get, $$x_2 = x - l_1 \sin \theta_1 \tag{6}$$

$$y_2 = y - l_1 \cos \theta_1 \tag{7}$$

substituting (6) and (7) into (5) we get, $$l_2^2 = (x - l_1 \sin\theta_1)^2 + (y - l_1 \cos\theta_1)^2 \tag{8}$$

expanding and rearranging this equation, $$x\cos\theta_1 + y\cos\theta_1 = \frac{x^2 + y^2 + l_1^2 - l_2^2}{2l_1} \tag{9}$$

divide both sides of the equation (9) by $$\sqrt{x^2 + y^2}$$

and from basic trigonometry, $$\frac{x}{\sqrt{x^2 + y^2}} = \cos\theta_{x,y} \tag{10}$$

$$\frac{y}{\sqrt{x^2 + y^2}} = \sin\theta_{x,y} \tag{11}$$

substituting (10) and (11) into (9), $$\cos\theta_{x,y}\sin\theta_1 + \sin\theta_{x,y}\cos\theta_1 = \frac{x^2 + y^2 + l_1^2 - l_2^2}{2l_1\sqrt{x^2 + y^2}} = \sin(\theta_{x,y} + \theta_1) \tag{12}$$

taking the arcsin of both sides of (12) and solving for $\theta_1$, $$\theta_1 = \tan^{-1}\left[\frac{A}{\sqrt{1-A}}\right] - \tan^{-1}\left(\frac{x}{y}\right) \tag{13}$$

where, $$A = \frac{x^2 + y^2 + l_1^2 - l_2^2}{2l_1\sqrt{x^2 + y^2}}$$

Equation (13) is an inverse kinematic relationship for the first link in the arm. To get the end effector to a desired (x,y) location, $\theta_1$ 94 the angle of the first link can now be determined. A relationship for the second link must also be known. The following trigonometric relationships can be determined from inspection of FIG. 6.

$$x = l_1 \cos\theta_1 + l_2 \cos(\theta_1 + \theta_2) \tag{14}$$

$$y = l_1 \sin\theta_1 + l_2 \sin(\theta_1 + \theta_2) \tag{15}$$

if both sides of equations (14) and (15) are squared and the equations added together, $$x^2 + y^2 = l_1^2 + l_2^2 + 2l_1 l_2 \cos\theta_2 \tag{16}$$

solving for $\theta_2$, $$\theta_2 = \left[\frac{x^2 + y^2 - l_1^2 - l_2^2}{2l_1 l_2}\right] \quad (17)$$

with equations (13) and (17) trajectories can be determined by the controller for optimal movement of the arm to get the end effector to the desired location and orientation to perform the requested task. The inverse kinematics of the two link robot allows calculation of the angles that the individual links must be at for the end effector to be at the required (x,y) location 98 to perform its task.

The following example uses the Lagrangian formulation for system dynamics to determine the torque required to move each link of the manipulator to the desired position. These expressions are also generated using the robot reference frame. Other techniques, including the Newton approach, may also be used to determine the dynamics of the robotic system.

The Lagrangian formulation uses kinetic energy and potential energy and their derivatives to determine the torque required to move the robotic arm to the desired location. Using the same geometry as in FIG. 6, the same kinematic relationships apply but mass now enters the derivation for the system dynamics. The masses $m_1$ 102 and $m_2$ 104 are the lumped equivalent masses for each link in the manipulator. For the first link, the following expressions define the kinetic energy (K) and the potential energy (P).

$$K_1 = \frac{1}{2} m_1 l_1^2 \dot{\theta}_1^2 \quad (18)$$

$$P_1 = m_1 g l_1 \cos\theta_1 \quad (19)$$

where g is the acceleration due to gravity. The position of the end effector in the robot reference frame is the same as (14) and (15) above, $$x_2 = l_1 \sin\theta_1 + l_2 \sin(\theta_1 + \theta_2) \quad (21)$$

$$y_2 = l_1 \cos\theta_1 + l_2 \cos(\theta_1 + \theta_2) \quad (22)$$

to find velocity components the derivatives of position are determined, $$\dot{x}_1 = l_1 \dot{\theta}_1 \cos\theta_1 + l_2(\dot{\theta}_1 + \dot{\theta}_2)\cos(\theta_1 + \theta_2) \quad (23)$$

$$\dot{y}_2 = -l_1 \dot{\theta}_1 \sin\theta_1 - l_2(\dot{\theta}_1 + \dot{\theta}_2)\sin(\theta_1 + \theta_2) \quad (24)$$

where $\dot{\theta}$ is the angular velocity of the links. The total velocity is, $$v_2^2 = \dot{x}_2^2 + \dot{y}_2^2 = l_1^2 \dot{\theta}_1^2 + l_2^2(\dot{\theta}_1 + \dot{\theta}_2)^2 2 l_1 l_2 \dot{\theta}_1(\dot{\theta}_1 + \dot{\theta}_2)\cos\theta_2 \quad (25)$$

The expression for the kinetic energy of link two becomes, $$K_2 = \frac{1}{2} m_1 l_1^2 \dot{\theta}_1^2 + \frac{1}{2} m_2 l_2^2 (\dot{\theta}_1 + \dot{\theta}_2)^2 + m_2 l_1 l_2 \dot{\theta}_1(\dot{\theta}_1 + \dot{\theta}_2)\cos\theta_2 \quad (26)$$

and the potential energy for link two becomes, $$P_2 = m_2 g l_1 \cos\theta_1 + m g l_2 \cos(\theta_1 + \theta_2) \quad (27)$$

In Lagrangian formulation torque (T) is defined to be, $$T = \frac{d}{dt}\frac{\partial K}{\partial \dot{\theta}_1} - \frac{\partial K}{\partial \theta_1} + \frac{\partial P}{\partial \theta_1} \quad (28)$$

where $K = K_1 + K_2$ and $P = P_1 + P_2$. Finding the components, $$\frac{\partial K}{\partial \dot{\theta}_1} = (m_1 + m_2) l_1^2 \dot{\theta}_1 + m_2 l_2^2(\dot{\theta}_1 + \dot{\theta}_2) + m_2 l_1 l_2 \cos\theta_2 (2\dot{\theta}_1 + \dot{\theta}_2) \quad (29)$$

$$\frac{d}{dt}\frac{\partial K}{\partial \dot{\theta}_1} = [(m_1 + m_2) l_1^2 + m_2 l_2^2 + 2 m_2 l_1 l_2 \cos\theta_2]\ddot{\theta}_1 + (m_2 l_2^2 + m_2 l_1 l_2 \cos\theta_2)\ddot{\theta}_2 - 2 m_2 l_1 l_2 \dot{\theta}_1 \dot{\theta}_2 \sin\theta_2 - m_2 l_1 l_2 \dot{\theta}_2^2 \sin\theta_2 \quad (30)$$

$$\frac{\partial P}{\partial \theta_1} = -(m_1 + m_2) g l_1 \sin\theta_1 - m_2 g l_2 \sin(\theta_1 + \theta_2) \quad (31)$$

the torque needed to move link one is, $$T_1 = [(m_1 + m_2)l_1^2 + m_2 l_2^2 + 2 m_2 l_1 l_2 \cos\theta_2]\ddot{\theta}_1 + (m_2 l_2^2 + m_2 l_1 l_2 \cos\theta_2)\ddot{\theta}_2 - 2 m_2 l_1 l_2 \dot{\theta}_1 \dot{\theta}_2 \sin\theta_2 - m_2 l_1 l_2 \dot{\theta}_2^2 \sin\theta_2 - (m_1 + m_2) g l_1 \sin\theta_1 - m_2 g l_2 \sin(\theta_1 + \theta_2) \quad (32)$$

A similar process determines the torque in link two, $$T_2 = \frac{d}{dt}\frac{\partial K}{\partial \dot{\theta}_2} - \frac{\partial K}{\partial \theta_2} + \frac{\partial P}{\partial \theta_2} \quad (33)$$

$$= m_2(l_2^2 + l_1 l_2 \cos\theta_2)\ddot{\theta}_1 + m_2 l_2^2 \ddot{\theta}_2 + m_2 l_1 l_2 \dot{\theta}_2^2 \sin\theta_2 - m_2 g l_2 \sin(\theta_1 + \theta_2)$$

When using GPS as the radio positioning system, a global reference frame is already defined. The origin of this global reference frame occurs at the intersection of the Prime Meridian (zero degrees longitude) and the equator (zero degrees latitude) which lies in the Atlantic Ocean about 380 miles south of Ghana and about 670 miles west of Gabon and has no particular significance. The GPS system does not conform to one of the standard type coordinate systems such as rectangular, cylindrical, or spherical. Kinematic and dynamic expressions governing robotic systems are typically derived in rectangular coordinates (x, y, z). In determining latitude, longitude, and elevation for the GPS coordinate system, the curvature of the earth must be taken into account. Since the curvature of the earth is very large in comparison to the area in which a manufacturing environment typically exists, GPS coordinates approximate a rectangular coordinate system in that limited area.

Figure 4:
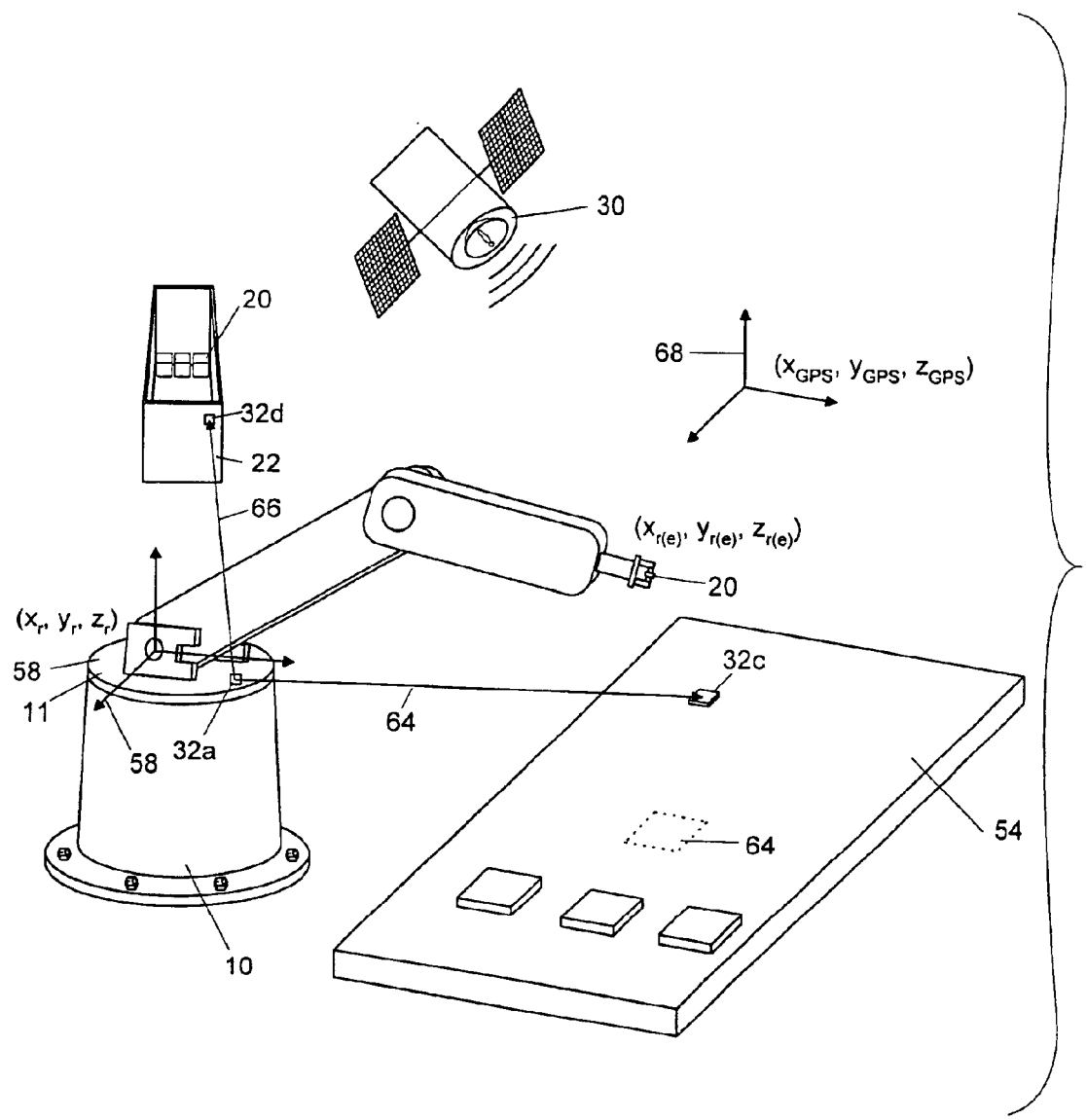
FIG. 4 demonstrates the relative GPS concept in a robotic system.

FIG. 4 represents a manufacturing system using GPS as a world reference frame, shown as reference frame 68 and a relative positioning system for a fixed robotic manipulator. GPS satellites, one shown as 30 broadcast timing information to position indicators 32*a, c, d* located on the manipulator rotating plate 11, work piece 54, and parts bin 20 respectively. The position indicators calculate a position and broadcast it to the robotic controller (not shown, see FIG. 2) to calculate the difference in coordinates required to identify the relative positions between the position indicators 32*a,c* on the manipulator rotating plate 11 and the work piece 54 and also between the position indicators 32*a,d* on the rotating plate and the parts bin 22. These relative positions are demonstrated in FIG. 4 by vectors 64, 66 drawn between position indicators 32*a*, 32*c* and 32*a*, 32*d* respectively.

This example of a workstation shows only one GPS position indicator 32*c*, rather than several position indicators on the work piece 54 for ease of demonstrating the principle of an automated assembly process. Multiple position indicators on multiple or single work pieces are also required for some orientations of the work pieces. Having one position indicator suggests that two axes of the reference frame are known and only the third must be determined from the GPS positioning system, however, the current invention allows for the work piece to be at any orientation assuming the proper number of GPS position indicators are located on the piece. For example, when initially setting up the process, the position indicator 32*a* fixed on the manipulator 10 has coordinates N 112.2314145°/W 33.5473738° and the position indicator 32*c* on the work piece 54 has coordinates N 112.2314147°/W 33.5473737°, the relative position between them is N 0.0000002°/W −0.0000001°. It is important to keep track of positive or negative values as they determine the direction of the relative position. For example, a negative value of west longitude is actually in an easterly direction. When the setup is complete and the process is started up, the next work piece will be moved into place using the relative measurements. Conditions may have changed such that the coordinates of the position indicator 32*a* on the manipulator now read N 112.2314147°/W 33.5473734°. To get the new work piece into position it would move along the conveyor (not shown in this figure) until the relative position is the same as for the setup piece. This means the position indicator on the work piece would report coordinates of N 112.2314149°/W 33.5473733° to attain a relative position of N 0.0000002°/W −0.0000001°.

This same relative positioning is used for the parts bin 22 for acquisition of parts by the manipulator as seen in FIG. 4. During setup of a new process, the parts bin can be put into position and the relative position, represented by vector 66, of the manipulator and parts bin identified for the new process. The position indicators 32*a, d* on the manipulator rotating plate 11 and parts bin 22 transmit their positions to the controller (item 12 in FIG. 2) for calculation of their relative positions. When parts bin 22 is emptied, another parts bin is put into place using the relative positioning values already defined during the setup. During setup the controller has been programmed for the location of the parts 20 within the bin 22.

Most robotic manipulators today have a fixed base, shown in FIG. 4 for instance, or run on rails or are supported by overhead gantries. Thus the work envelope of the robotic manipulators are generally fixed or confined to a region. In addition to the fixed or limited operational area, the present invention contemplates that the robot, or robots, can be mounted on a boundary-less transportation system, thus making them mobile robotic manipulators, permitting travel to any location within a defined area, typically the manufacturing environment.

FIG. 5 demonstrates this free ranging principle in an aircraft manufacturing environment, which is generally very costly in terms of man/hours employed to perform all of the tasks associated with aircraft construction. GPS satellites such as those shown as 30 broadcast timing signals to position indicators 32*e* and 32*f* located at fixed points on the robot transportation systems such as 71*a* and 71*b*, allowing for continual tracking of the position of the robot transportation systems by a controller (not shown in the figure). GPS position indicators such as 32*g–l* are placed at the locations on the aircraft or any work piece involved in the operation providing position information of a particular part/location to the controller. The controller has been programmed with the functions and tasks that the robot is expected to perform and the relative GPS coordinates where those tasks are to be performed. A single robot, such as robot 72, with the capability of accepting many different tools on its end effector performs different functions needed to complete a task. These include, but are not limited to, welding, riveting, drilling, etc. As an example, the mobile robotic manipulator 72 on transportation system 71*a*, may be drilling holes using a drill carried in its end effector (drill not shown) at its current location generally 74. The robot 72 can be instructed to change tools and move to location generally shown as dotted line position generally 76 and begin riveting, welding, or any other function it can retool to accomplish. After accomplishing the prescribed task at location 76, the mobile robotic manipulator 72 on transportation system 71*a*, can be instructed to retool again and move to location generally shown as dotted line position generally 78 and perform the next task required of it. The initial effort to program the operations to be performed by this mobile robotic manipulator may be extensive, but substantial benefit is realized by performing repeated tasks for which the training is already complete.

The concept of mobile robotic manipulators, such as the robots seen in FIG. 5, also makes use of relative positioning techniques. During setup of any particular operation, the manipulator is put into position and the coordinates of a position indicator on the manipulator and a position indicator located on the aircraft in close proximity to the operation to be performed are transmitted to the controller. The controller calculates the relative position and stores it for future reference. When it comes time to perform the desired operation, the controller drives the mobile manipulator to the same relative values as previously stored. That is, the mobile robotic manipulator is positioned near the aircraft in close proximity to the operation to be performed.

Figure 7:
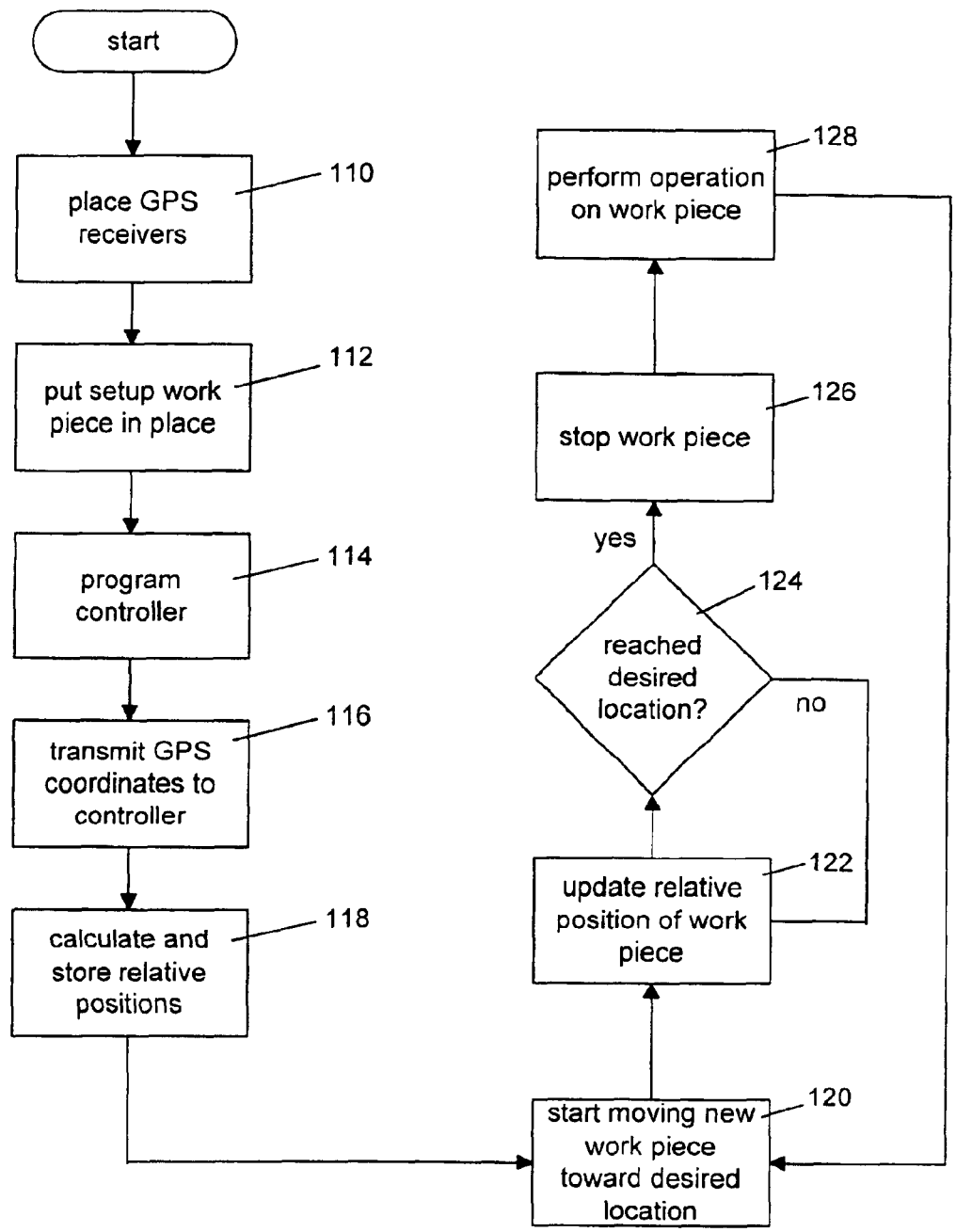
FIG. 7 is a flow chart showing system operation with relative GPS.

FIG. 7 is a flow chart demonstrating how an in-line type manufacturing system operates using the relative GPS positioning. GPS position indicators are placed at all required locations, activity shown at box 110, including manipulators, work pieces, and parts bins. Next a setup work piece is put into the exact location, activity shown at box 112 for the manufacturing process. A technician programs the controller to perform actions associated with the process, as shown at box 114. GPS coordinates of position indicators such as 32 located on a manipulator rotating plate 11 (refer to FIG. 4 and FIG. 2), work piece 54, and parts bin 22 are now transmitted to the controller, activity shown at box 116. The controller calculates and stores all necessary relative positions between the manipulator and work piece or parts bins, as shown at box 118.

The controller instructs, in one example of the invention, the material handling system to start moving a new work piece, as shown by box 120, towards the desired location. The controller updates the relative position of the work piece and the manipulator, as shown by box 122. The controller determines if the work piece is at the desired location, activity performed at box 124. If the work piece is not at the desired relative position, the controller waits a specified period and again determines the relative position between the work piece and manipulator, activity performed at box 122. If the work piece has reached the desired relative position, the controller instructs the material handling system to stop, as shown by box 126. At this point the specified manufacturing process can be initiated, as shown by box 128. When the process is complete, the controller commands the motion system to begin moving a new work piece into place by looping back and performing the task shown in box 120.

Another aspect of automatic manufacturing that benefits greatly from the present invention is part or tool acquisition by a robotic manipulator. A robotic system typically has a supply of parts made available to it due to its limited mobility. The parts are made available through human effort or some automatic process such as a conveyor system moving parts in synchronism with the robotic process being performed. If a tool change is required, human effort is the primary mechanism by which the change is accomplished. To further automate manufacturing in accordance with the present invention, a robotic manipulator is designed such that it acquires its own parts or makes its own tool changes when switching to a new process.

In a system where there is more than one robotic manipulator one of the robotic manipulators may be used for parts acquisition for the other robotic manipulators that are assigned to performing manufacturing tasks. Furthermore, scheduling can be implemented wherein an idle robotic manipulator in a manufacturing situation may be programmed to perform part acquisition and restocking operations during the idle time of any particular robotic manipulator in the system.

Figure 8:
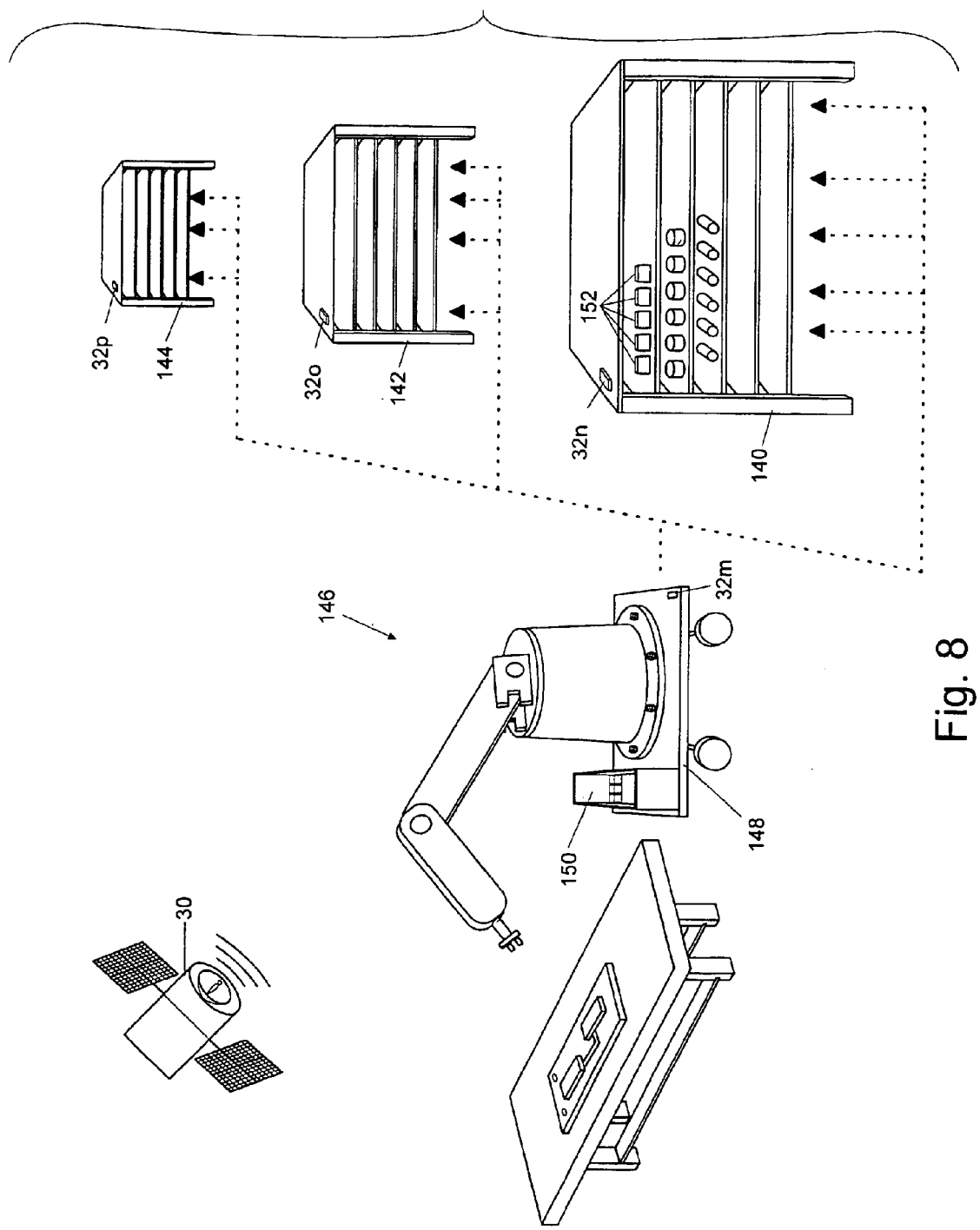
FIG. 8 shows a mobile robotic system in an inventory manipulation situation using relative GPS positioning.

FIG. 8 demonstrates how the current invention accomplishes this through storage of parts and tools with relative radio positioning techniques. A preferred embodiment uses the available infrastructure of GPS to accomplish parts and tools acquisitions. GPS position indicators 32m–p are placed on the mobile robotic manipulator, generally 146, and the parts/tools storage racks 140, 142, 144; first, second, and third respectively. The GPS satellites, one shown as 30, provide position information for position indicators that broadcast this information to the controller (not shown) to determine the relative positions. Mobile robotic manipulator 146, on motorized base 148, can now move to the desired storage location and retrieve the desired parts or tool. Previous programming has been performed for the necessary mobile robotic manipulator acts to acquire the parts/tools once the correct relative location is achieved. A parts bin 150 can be attached to the motorized base providing a temporary storage location for parts acquired from the storage area. The parts can be used directly from the bin 150 attached to the motorized base or move from this portable bin to a fixed bin 22, FIG. 2, in the manufacturing area.

As an example, if block parts 152, on first rack 140 are required for the next process to be performed by the robot 146, they can readily be accessed by propelling motorized base 148 to the proper relative location in front of or otherwise proximate the rack 140. Once located properly relative to the rack 140, the controller can execute preprogrammed instructions for acquisition of the block parts 152. If five blocks are required, the controllers outputs the proper drive signals instructing the robotic arm to pick each one of the five blocks 152 in turn (or in ganged assemblies or sets). If a future process requires blocks 152 from the first rack 140 the controller will remember where to start for the new batch of blocks assuming that the removed blocks in an earlier act were not replaced. If new blocks 152 for the first rack 140 arrive, either human effort can replace the stock or the robotic system may be programmed to restock the newly arrived pieces. In either case, the controller must be updated as to where and how many blocks 152 exist in the rack 140.

GPS relative radio positioning is the preferred embodiment for the present invention. Other localized techniques would perform equally well. Also, GPS signals may not have sufficient strength for some manufacturing facilities, such as underground sites. Manufacturing sites not capable of receiving GPS signals will still benefit from a localized positioning scheme.

Figure 9:
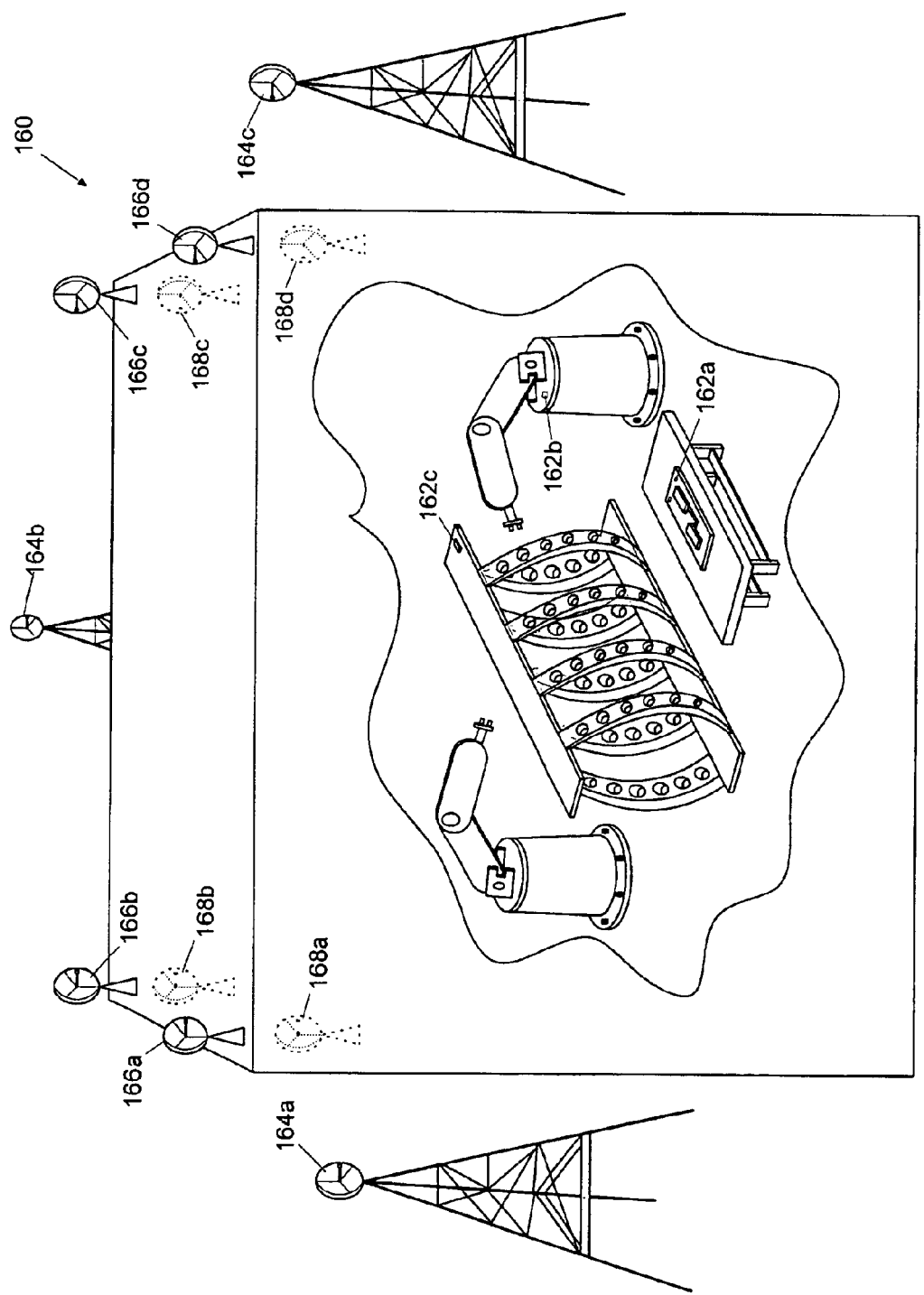
FIG. 9 shows an alternative relative radio positioning information scheme using locally generated timing signals.

FIG. 9 demonstrates a building that houses a manufacturing facility generally 160. Position indicators 162a, b, and c are placed on work pieces, the robot, and any other required location just as in the GPS type positioning system. Broadcasting hardware is located on nearby towers 164a–c or directly on the building 166a–d or in the building 168a–d when local broadcasting hardware is used. The advantage of this scheme over relying on a satellite based scheme, is the improved accuracy attainable due the reduced signal paths. As discussed above, greater processing of the GPS timing signals is required in satellite based systems due to distortion attributed to the long signal paths. One disadvantage of a local broadcasting system described above is the additional setup costs due to purchasing broadcast hardware for each new manufacturing center. This can be partially mitigated by using a communal set up for a group of buildings located in close proximity to one another. These buildings may share a common set of broadcasting hardware without any denigration of capability of the system functionality if properly designed and maintained.

The current invention requires position indicators that are unobtrusive to the manufacturing process that it is involved with. One concept to minimize position indicator size is to implement signal translation for the raw positioning data. Translational GPS has been used to simplify position indicator design for use in missile technology. Most GPS position indicators process timing information from the satellites to generate latitude, longitude, and altitude. A significant amount of information is stored for processing positions, such as ephemeris data for each satellite. This type of position indicator retransmits the raw GPS position information on another carrier frequency to a host computer for calculation of the position. This technique significantly reduces the processing and memory requirements of the position indicator. GPS position indicators require a significant amount of storage for geodetic datum to correct for the earths irregularities. Minimizing the position indicator complexity reduces size of the position indicator and cost as well.

The inventions set forth above are subject to many modifications and changes without departing from the spirit, scope or essential characteristics thereof. Thus, the embodiments explained above should be considered in all respect as being illustrative rather than restrictive of the scope of the inventions as defined in the appended claims. For example, the present invention is not limited to the specific embodiments, apparatuses and methods disclosed for manufacturing systems using GPS alignment systems but also include applications where GPS alignment systems may be helpful in locating articles inside or outside a building. For instance, this invention would be usable in inventory situation where an article may have a position indicator attached thereto or to a bin containing the article. A retrieval device could then be dispatched to the tagged article. Another example is a parking garage situation where a car, or the like, is tagged when parked and when access to the car is needed the location can be quickly and easily sensed and a retrieval vehicle or operator delivery vehicle can be dispatched to the tagged vehicle. The present invention is not limited to any particular form of computer or computer algorithm. It is expected that a range of controllers, from a general-purpose computer to a dedicated computer, can be used as the controller for controlling the retrieval apparatus and related transmitter and sensor interface operations.

In summary, one embodiment of a system for using GPS in a manufacturing situation where parts and assemblies are coordinated with the position and operation of a robotic manipulator has been presented. The system is based on the use of satellite GPS and, as one alternative embodiment, based on the use of a local radio positioning system having position signal transmitters located on a building or in a building or complex. The manufacturing system determines the location of a work product by having a sensor, position indicator, or marker mounted on the work product send a signal to a processor. The system determines the position of the tool or robotic manipulator by having a second sensor mounted on the manipulator send a signal to the processor. The location of each of the position indicators is thus known at the processor and coordinated action can then be taken by the robotic manipulator relative to the work piece as programmed or otherwise directed by the processor. In addition the system is used for inventory control, such as but not limited, to restocking articles and items to be acted on or distributed at a later date, tool and item retrieval, processing of a work part such as by welding, painting, sanding, machining or otherwise having some effect on, or performing some operation on, a work piece or an object element.

One method presented herein, disclosing the invention broadly, includes the method of locating an object relative to a transitionable element. The acts involved in the method include associating a marker, also described herein as a "position indicator," or "sensor," with the object and determining the location of the marker. (The marker may be a radio signal transceiver capable of receiving or sending a radio signal corresponding the location of the object with which the marker is associated. The location of the marker, and thus the apparatus to which the marker is attached, comprises locating the position of the object or transitionable element relative to a coordinate reference system. That information may then be stored in the controller or computer.) The object's location is detected by determining the position of the associated marker by use of the GPS or local radio positioning systems described herein. The location of the object is then stored in a controller, most commonly a computer having storage and a processor. A second marker is associated with the transitionable element. The transitionable element may have a variable location. The location of the transitionable element is stored in a controller, as was the location of the object. The controller, usually the computer set-forth above, is capable of determining the location of the object relative to the location of the transitionable element by comparing the stored location of the object to the transitionable element. The next act may be affecting the relative location of the transitionable element and the object. This would allow the transitionable element to, for instance, retrieve the object and deliver it to a desired location or to allow the performance of some act relative to the object as affected by the transitionable element. In summary, the act of determining the location of the object relative to the transitionable element includes the acts of retrieving the location of the object from the controller, retrieving the location of the transitionable element from the controller and comparing the location of the transitionable element to the stored location of the object in the controller to determine the location of the object relative to the transitionable element. The location of the transitionable element relative to the location of the object is affected by movement of the transitionable element generally relative to the location of the object.

The inventions set forth above are subject to many modifications and changes without departing from the spirit, scope or essential characteristics thereof. Thus, the embodiments explained above should be considered in all respect as being illustrative rather than restrictive of the scope of the inventions as defined in the appended claims. For example, the present invention is not limited to the specific embodiments, apparatus and methods disclosed for a GPS based manufacturing system, it could be used in a warehouse distribution system or element or apparatus directing system. The present invention is also not limited to only the use of GPS communication satellites and GPS position indicators to determine locations of work pieces, articles or manipulators in the system. For instance, a second input such as a camera, proximity switch, alignment jig, or any supplemental locating device, connected to the processor or not, can be incorporated in the system where GPS location is in combination with other location determining systems to enhance the accuracy and efficacy of the system. The present invention is also not limited to any particular form of processor, computer or computer algorithms. The embodiment set forth is provided to show the embodiments, including the best mode known to the inventors, which are immediately useful to the manufacturing community.

Thus the present invention has been described in connection with certain preferred embodiments. These preferred embodiments are exemplary of certain modes of practicing the invention. A person skilled in the art will realize many alternatives to specific examples of equipment described herein.

Therefore, while the invention has been described in connection with certain preferred embodiments, it is not intended to limit the scope of the invention to the particular forms set forth, but, on the contrary, it is intended to cover such alternatives, modifications and equivalents as may be included within the spirit and scope of the invention as defined by the appended claims. For instance, the specification includes a description of a robotic manipulator have a set of two links connected to a base and terminated in an end effecter. It is contemplated that the GPS manufacturing system could be based on manipulators having more or fewer than two links. Furthermore, the drawings show the manipulators acting relatively from above the work piece and conveyor systems, there is no requirement that this deployment is the only deployment and the manipulator could address the work piece from the bottom as well as from the top as shown in the various figures. Such a broad application of the GPS based manufacturing system using GPS type position location schemes, as well as other applications fairly covered by the following claims, is contemplated by the inventors herein.

What is claimed is:

1. A system for controlling manufacturing operations, the system comprising:
    (a) a robotic manipulator;
    (b) a radio signal positioning system in communication with the robotic manipulator and one or more work pieces; and
    (c) a controller responsive to radio signal positioning information from the robotic manipulator and from the work pieces;
    (d) wherein the controller is controllably coupled to the robotic manipulator, thereby directing it to perform manufacturing operations on the work pieces; and
    (e) the controller processes the radio signal positioning system inputs from the robotic manipulator and from the work pieces to locate the robotic manipulator relative to the work pieces.

2. The system of claim 1 further comprising position indicators, each position indicator comprising:
    (a) a radio signal receiver for receiving position information from the relative radio signal positioning system;
    (b) processing capability; and
    (c) a transceiver for communication with the controller.

3. The system of claim 2 wherein the radio signal receiver further comprises a decoder for decoding the radio position information from the relative radio signal positioning system.

4. The system of claim 2 wherein the transceiver transmits encoded position information to the controller and receives commands from the controller.

5. The system of claim 1 wherein the radio positioning system further comprises:
    (a) a relative radio positioning system;
    (b) multiple sources of encoded radio signals located remotely from the robotic manipulator and the work piece;
    (c) a position indicator attached to the robotic manipulator; and
    (d) a position indicator attached to the work piece;
whereby the encoded radio signals permit precise calculation of distance from each source of radio signal to the position indicator attached to the robotic manipulator and the position indicator attached to the work piece thereby facilitating precise determination of relative coordinate locations of the robotic manipulator and the work piece.

6. The system of claim 5 wherein the controller controls work piece movement relative to the robotic manipulator based on position information derived from the relative radio positioning system.

7. The system of claim 5 wherein the controller directs the robotic manipulator to move relative to the work piece based on position information derived by the controller from the relative radio positioning system.

8. The system of claim 5 wherein the encoded radio signal comprises precisely timed signal pulses.

9. The system of claim 5 wherein the multiple sources comprise earth-orbiting satellites.

10. The system of claim 9 wherein the earth orbiting satellites are from a global positioning system.

11. The system of claim 10 where the global positioning system comprises the NAVSTAR global positioning system.

12. The system of claim 10 where the global positioning system comprises the GLONASS system.

13. The system of claim 10 where the global positioning system comprises components of the NAVSTAR global positioning system and of the GLONASS system.

14. The system of claim 5 wherein the robotic manipulator further comprises a video scanner and image analysis computer capable of scanning the work piece to locate a mark on the work piece, whereby the mark on the work piece facilitates a determination of work piece location relative to the robotic manipulator.

15. A system for controlling parts acquisitions for manufacturing processes comprising:
    (a) an autonomous mobile robotic system including a mobile robotic manipulator;
    (b) a parts storage area;
    (c) a controller controllably coupled to the mobile robotic systems, thereby directing the mobile robotic system to perform parts acquisition operations; and
    (d) a radio signal positioning system;
    (e) wherein the radio signal positioning system guides the mobile robotic manipulator to designated locations.

16. The system of claim 15 wherein a plurality of mobile robotic manipulators are included in the system and one of the mobile robotic manipulators is used for parts acquisition for the other robotic manipulators performing manufacturing tasks.

17. The system of claim 15 wherein a mobile robotic manipulator can acquire and attach a tool for a manufacturing process to itself.

18. A method of locating an object relative to a transitionable element comprising the acts of:
    (a) associating a marker with the object;
    (b) determining a location of the object by determining a position of the associated marker;
    (c) storing the location of the object;
    (d) associating a second marker with a transitionable element of variable location;
    (e) determining the location of the transitionable element by determining the position of the marker associated with the transitionable element;
    (f) storing the location of the transitionable element;
    (g) determining the location of the object relative to the transitionable element by comparing the stored location of the object to the stored location of the transitionable element; and
    (h) changing the relative location of the transitionable element and the object.

19. The method of claim 18 wherein associating a marker with the object comprises locating the marker on the object.

20. The method of claim 19 wherein the marker is a radio signal position indicator including a radio transmitter and a radio receiver.

21. The method of claim wherein 18 determining the location of the object comprises locating the position of the object relative to a coordinate reference system.

22. The method of claim 21 wherein locating the object is accomplished by determining the position of the object in the coordinate reference system and storing the location of the object.

23. The method of claim 22 wherein storing the location of the object comprises entering the location of the object in a controller.

24. The method of claim 23 wherein determining the location of the transitionable element comprises recording the position of the transitionable element relative to a coordinate reference system.

25. The method of claim 24 wherein recording the position of the transitionable element comprises entering the location of the transitionable element in a controller.

26. The method of claim 25 wherein determining the location of the object relative to the transitionable element comprises
   (a) retrieving the location of the object from the controller;
   (b) retrieving the location of the transitional element from the controller;
   (c) comparing the location of the transitionable element to the stored location of the object in the controller to determine the location of the object relative to the transitionable element.

27. The method of claim 18 wherein changing the location of the transitionable element relative to the object includes moving the transitionable element.

28. The method of claim 27 wherein the controller is a computer having a processor and storage for the locations of the object and the transitionable element.

29. A manufacturing system comprising:
   (a) a robotic manipulator;
   (b) a plurality of work pieces;
   (c) a signal positioning system responsive to positions of the robotic manipulator and the work pieces; and
   (d) a controller responsive to information from the signal positioning system regarding position between the robotic manipulator and the work pieces;
   (e) wherein the robotic manipulator is responsive to control signals from the controller, thereby performing manufacturing operations on the work pieces.

* * * * *